(12) United States Patent
Mullin et al.

(10) Patent No.: US 10,281,306 B2
(45) Date of Patent: May 7, 2019

(54) FLOW METER SYSTEM

(71) Applicant: CAMERON INTERNATIONAL CORPORATION, Houston, TX (US)

(72) Inventors: Michael Mullin, Longford (IE); Eddie McHugh, Longford (IE); Don Augenstein, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 69 days.

(21) Appl. No.: 15/265,521

(22) Filed: Sep. 14, 2016

(65) Prior Publication Data

US 2017/0074699 A1 Mar. 16, 2017

Related U.S. Application Data

(60) Provisional application No. 62/218,562, filed on Sep. 14, 2015.

(51) Int. Cl.
*G01F 1/66* (2006.01)
*E21B 47/10* (2012.01)

(52) U.S. Cl.
CPC .............. *G01F 1/662* (2013.01); *E21B 47/10* (2013.01)

(58) Field of Classification Search
None
See application file for complete search history.

(56) References Cited

U.S. PATENT DOCUMENTS

| | | | | |
|---|---|---|---|---|
| 4,140,012 A | * | 2/1979 | Hendriks | G01F 1/662 73/273 |
| 4,480,486 A | * | 11/1984 | Meisser | G01F 1/662 73/861.28 |
| 4,506,552 A | | 3/1985 | Brown et al. | |
| 4,635,678 A | * | 1/1987 | Peterman | F16K 3/265 137/551 |
| 5,684,253 A | * | 11/1997 | Bonne | G01L 19/0038 73/706 |
| 5,773,723 A | * | 6/1998 | Lewis | G01F 1/58 138/133 |
| 5,777,237 A | * | 7/1998 | Collier | G01F 1/662 73/861.27 |
| 5,907,099 A | * | 5/1999 | Huang | G01F 1/662 73/597 |

(Continued)

FOREIGN PATENT DOCUMENTS

| | | |
|---|---|---|
| JP | 02-032217 A | 2/1990 |
| JP | 2004-061125 A | 2/2004 |
| JP | 2005-180988 A | 7/2005 |

OTHER PUBLICATIONS

International Search Report dated Dec. 8, 2016, for international patent application No. PCT/US2016/051744 (3 p.).

*Primary Examiner* — Harshad R Patel
(74) *Attorney, Agent, or Firm* — Conley Rose, P.C.

(57) ABSTRACT

A flow meter system is disclosed that includes a first flow sensor and first and second fluid flow conduits extending from the first flow sensor. The second fluid flow conduit may be disposed inside the first fluid flow conduit thereby forming a fluid annulus between the first and second fluid flow conduits. The first fluid flow conduit may be metal to resist a fluid pressure differential and the second fluid flow conduit may be non-metal to balance a fluid pressure across the second fluid flow conduit and attenuate noise therein. The fluid annulus may be configured to receive a fluid to balance the fluid pressure across the second fluid flow conduit.

17 Claims, 10 Drawing Sheets

(56) References Cited

U.S. PATENT DOCUMENTS

| | | | |
|---|---|---|---|
| 6,338,277 B1* | 1/2002 | Diston | G01F 1/662 73/861.27 |
| 6,561,043 B1* | 5/2003 | Bailey | G01F 1/40 73/861.52 |
| 8,245,581 B2 | 8/2012 | Gottlieb et al. | |
| 8,522,623 B2 | 9/2013 | Quin et al. | |
| 8,522,624 B2 | 9/2013 | Quin et al. | |
| 8,806,734 B2 | 8/2014 | Gottlieb et al. | |
| 2003/0034202 A1 | 2/2003 | Zanker | |
| 2003/0226405 A1* | 12/2003 | Bell | G01F 1/40 73/861.52 |
| 2004/0003658 A1* | 1/2004 | Han | E21B 47/01 73/152.47 |
| 2007/0062305 A1* | 3/2007 | Muller | G01F 1/662 73/861.28 |
| 2008/0196511 A1* | 8/2008 | Ehring | G01F 1/662 73/861.31 |
| 2010/0043897 A1* | 2/2010 | Grace | E21B 33/076 137/624.27 |
| 2011/0036439 A1* | 2/2011 | Fernald | G01F 1/662 138/104 |
| 2011/0297392 A1* | 12/2011 | McHugh | E21B 33/076 166/373 |
| 2012/0006556 A1* | 1/2012 | McHugh | E21B 33/076 166/344 |
| 2012/0222492 A1* | 9/2012 | Quin | G01F 1/662 73/861.28 |
| 2012/0312522 A1* | 12/2012 | Quin | G01F 1/662 166/53 |
| 2013/0199615 A1* | 8/2013 | McHugh | F16K 49/005 137/1 |
| 2014/0053659 A1 | 2/2014 | Quin et al. | |

* cited by examiner

FLOW METER SYSTEM

CROSS-REFERENCE TO RELATED APPLICATIONS

This application claims benefit of U.S. provisional patent application Ser. No. 62/218,562 filed Sep. 14, 2015, entitled "Flow Meter System," which is hereby incorporated herein by reference in its entirety.

STATEMENT REGARDING FEDERALLY SPONSORED RESEARCH OR DEVELOPMENT

Not applicable.

BACKGROUND

Flow meters are used in various industries to measure flow rates of moving fluids. For example, flow meters are used in the hydrocarbon exploration and production industry to measure various fluids moving in pipelines or other conduits during the process of drilling and producing an oil and gas well. A well is drilled to below the surface of the earth such that oil, natural gas, and water can be extracted via the well. Some wells are used to inject materials below the surface of the earth. For example, materials or fluids can be injected below the surface of the earth to sequester carbon dioxide, store natural gas for later use, or to inject steam or other substances near an oil well to enhance recovery. In some cases, a well can be maintained or enhanced using a chemical injection management system. A chemical injection management system may inject corrosion-inhibiting materials, foam-inhibiting materials, wax-inhibiting materials, antifreeze, and/or other similar chemicals to extend the life of a well or increase the rate at which resources are extracted from a well. Such materials may be injected into the well in a controlled manner over a period of time. The chemical injection management system may include a flow meter to measure and help regulate the injected material flow rate.

SUMMARY

In some embodiments, a flow meter system includes a first flow sensor and first and second fluid flow conduits extending from the first flow sensor. The second fluid flow conduit may be disposed inside the first fluid flow conduit thereby forming a fluid annulus between the first and second fluid flow conduits. The first fluid flow conduit may be metal to resist a fluid pressure differential and the second fluid flow conduit may be non-metal to balance a fluid pressure across the second fluid flow conduit and attenuate noise therein. The second fluid flow conduit is attenuative to absorb ultrasound along non-fluid paths. The fluid annulus may be configured to receive a fluid to balance the fluid pressure across the second fluid flow conduit. The second fluid flow conduit may include an internal bore to receive a process fluid that is also the received fluid of the fluid annulus. The flow meter system may further include a second flow sensor, wherein the first and second fluid flow conduits extend between the first and second flow sensors.

In some embodiments, the flow meter system may further include a housing surrounding the first flow sensor and an axial distance between an end face of the first and second fluid flow conduits and the first flow sensor in the first flow sensor housing. The axial distance forms a fluid chamber, and in some embodiments, the fluid chamber disposed between the fluid flow conduits and the sensor is operable to reduce fluid cavitation. The axial distance may be a pre-determined focal length for the first flow sensor. The first flow sensor may include a pre-determined window thickness.

In some embodiments, the flow meter system further includes a housing surrounding the first flow sensor and a fluid inlet in the first flow sensor housing having an angled junction. In some embodiments, the angled junction serves to reduce fluid cavitation. The angled inlet may serve as a flow passage directing fluid into a fluid chamber of the sensor housing.

In some embodiments, the noise attenuation of the second fluid flow conduit allows the first flow sensor to measure a laminar flow rate at high pressure. In some embodiments, the first flow sensor is configured to measure a fluid viscosity. In some embodiments, an internal bore of the second fluid flow conduit is adjustable. In further embodiments, the internal bore is configured to flow a fluid in a viscosity range of 0.1 cP to 500 cP. In some embodiments, a seal is disposed between the first and second fluid flow conduits to stagnate the received fluid in the fluid annulus.

In some embodiments, a flow meter system includes metal seals axially offset from an ultrasonic piezoelectric crystal. The flow meter system may include a housing surrounding the first flow sensor and having a first metal seal between the housing and the first flow sensor, and a second metal seal between the housing and the first fluid flow conduit, wherein the first and second metal seals are axially offset relative to a crystal of the first flow sensor. In some embodiments, the flow meter system includes a first housing surrounding the first flow sensor and having a first metal seal between the first housing and the first flow sensor, a second metal seal between the first housing and the first fluid flow conduit, wherein the first and second metal seals are axially offset relative to a crystal of the first flow sensor, a second housing surrounding the second flow sensor and having a third metal seal between the second housing and the second flow sensor, a fourth metal seal between the second housing and the second fluid flow conduit, wherein the third and fourth metal seals are axially offset relative to a crystal of the second flow sensor. In some embodiments, the flow meter system is coupled to a chemical injection management system

BRIEF DESCRIPTION OF THE DRAWINGS

For a detailed description of exemplary embodiments, reference will now be made to the accompanying drawings in which.

DETAILED DESCRIPTION

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure includes embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1:
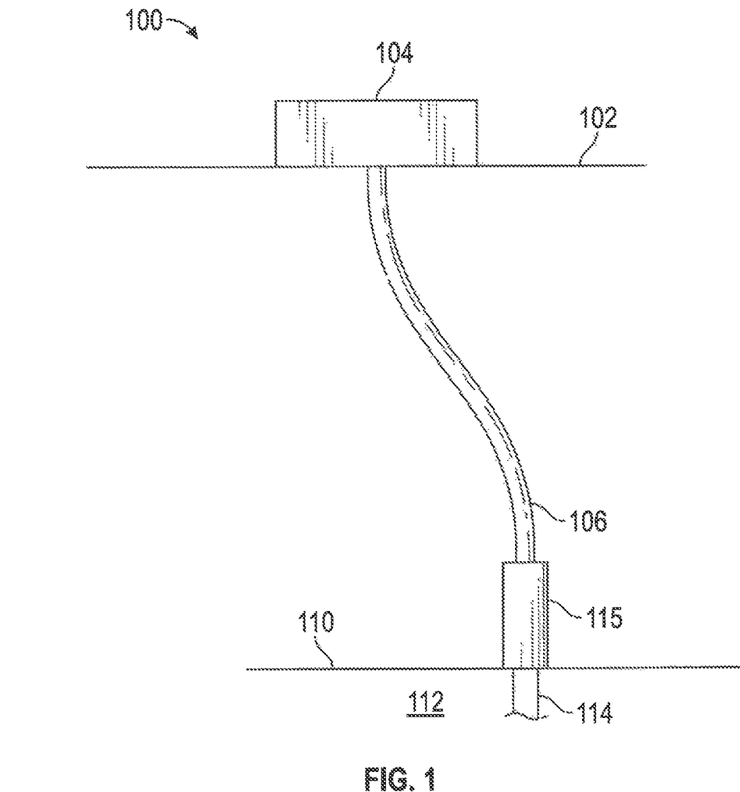
FIG. 1 is a schematic view of an embodiment of a well system.

FIG. 1 is a schematic diagram showing an embodiment of a well system 100. The well system 100 can be configured to extract various minerals and natural resources, including hydrocarbons (e.g., oil and/or natural gas), or configured to inject substances into an earthen surface 110 and an earthen formation 112 via a well or wellbore 114. In some embodiments, the well system 100 is land-based, such that the surface 110 is land surface, or subsea, such that the surface 110 is the sea floor. The system 100 includes a wellhead 115 disposed over the wellbore 114. The system 100 may be used to extract oil, natural gas, and other related resources from the wellbore 114 and the wellhead 115, through a conduit 106, and to an extraction point 104 at a surface location 102. The extraction point 104 may be an on-shore processing facility, an off-shore rig, or any other extraction point. The system 100 may also be used to inject fluids, such as the materials noted above, into the wellbore 114. The injected fluids may be supplied to the subsea equipment using the conduit 106, which may include flexible jumper or umbilical lines. The conduit may comprise reinforced polymer and small diameter steel supply lines, which are interstitially spaced into a larger reinforced polymer liner. As the working pressure of the subsea equipment increases, the supply pressures and injection pressures also increase.

Figure 2:
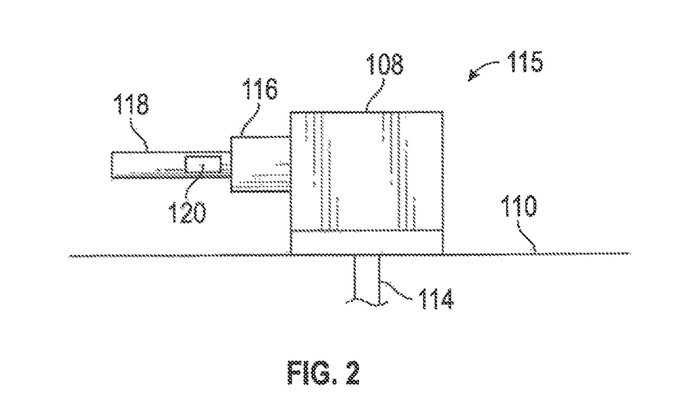
FIG. 2 is a schematic view of an embodiment of wellhead and chemical injection management system of the well system of FIG. 1.

Referring now to FIG. 2, the wellhead 115 includes a Christmas tree or tree 108. The tree 108 includes a valve receptacle 116 and a chemical injection management system (CIMS) 118. When assembled, the tree 108 may couple to the well 114 and include a variety of valves, fittings, and controls for operating the well 114. The chemical injection management system 118 is coupled to the tree 108 via the valve receptacle 116. The tree 108 provides fluid communication between the chemical injection management system 118 and the well 114. The chemical injection management system 118 further includes a flow valve or flow regulator assembly 120, and as explained below, the chemical injection management system 118 may be configured to regulate the flow of a fluid through the tree 108 and into the well 114 using the flow valve assembly 120.

Figure 3:
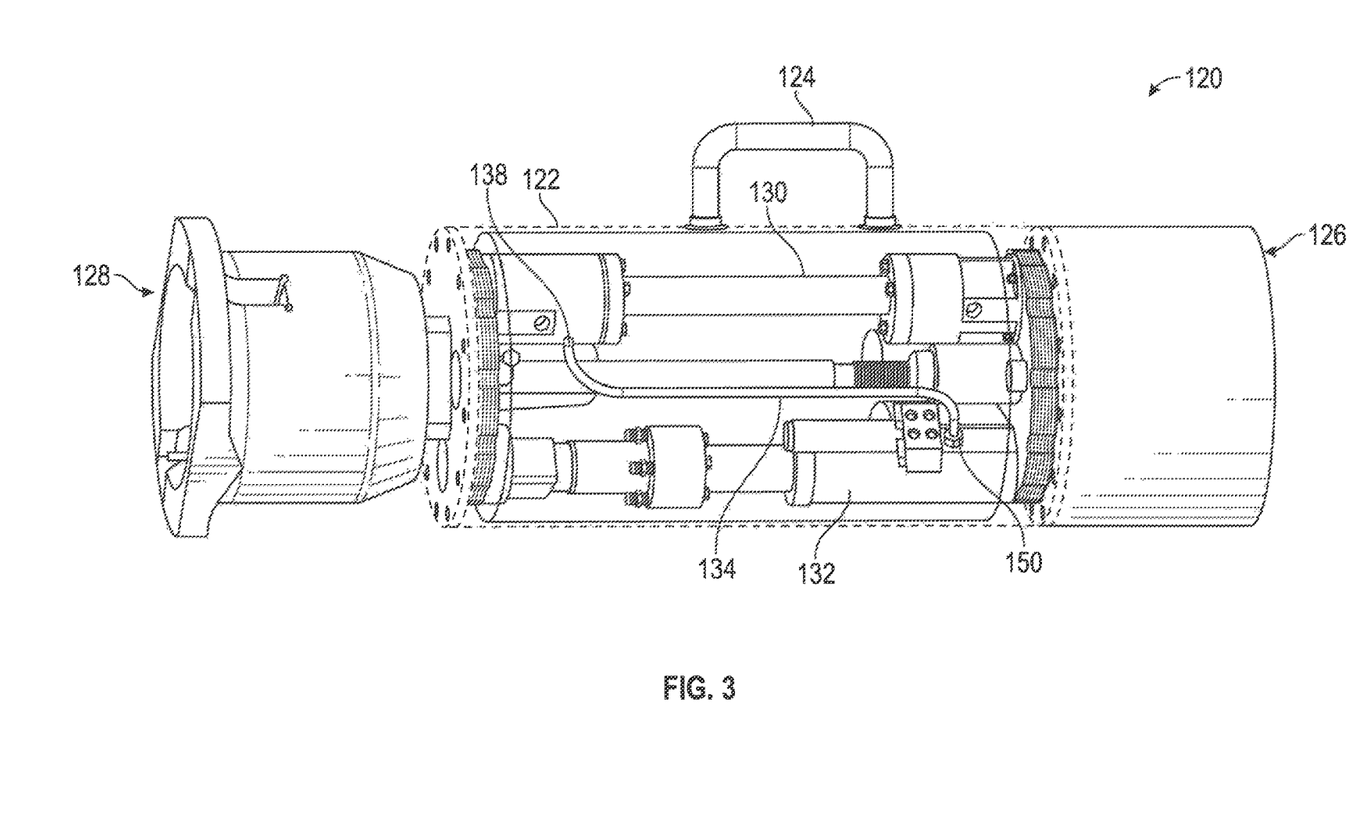
FIG. 3 is a perspective, partial phantom view of a flow meter and valve or regulator assembly of FIG. 2.
Figure 4:
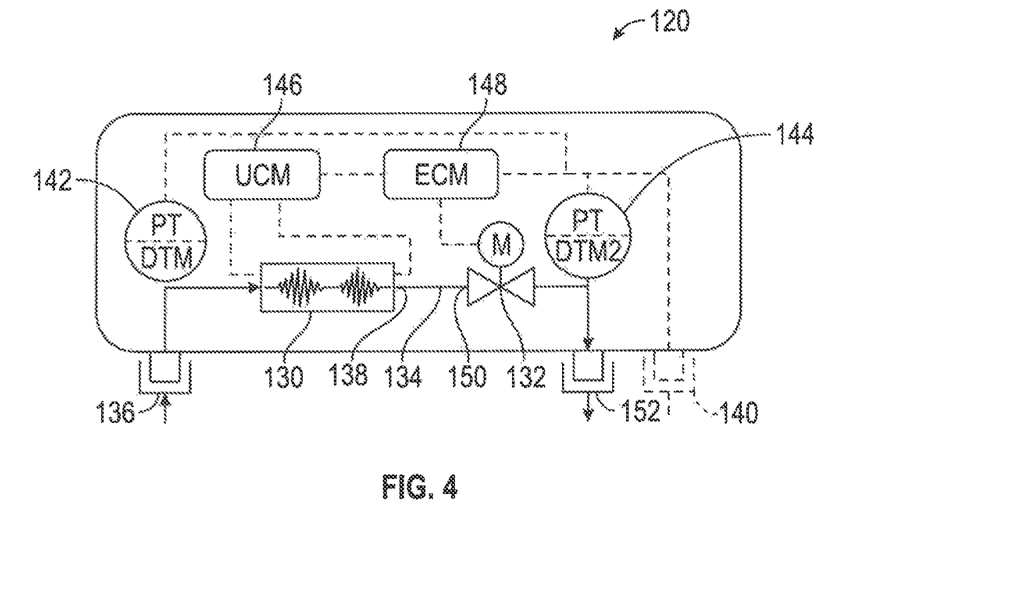
FIG. 4 is a schematic of the architecture of the flow meter and valve or regulator assembly of FIG. 3.

Referring now to FIG. 3, a perspective and partial phantom view of the flow meter and valve assembly 120 is shown. The flow valve assembly 120 includes a housing 122 with a handle 124, a first coupling interface 126, and a second coupling interface 128. In some embodiments, the coupling interfaces 126, 128 are used to couple to the chemical injection management system 118, the tree 108, an ROV (remotely operated vehicle), or other portions of the wellhead 115 equipment. The housing 122 contains a flow meter 130, a valve actuator assembly 132, and a conduit or flowline 134 fluidly coupling an inlet 150 of the valve actuator assembly 132 to an outlet 138 of the flow meter 130. The housing 122 may also contain other mechanical, electrical, and hydraulic components of the flow meter and valve assembly 120. For example, and referring to FIG. 4, the flow meter and valve assembly 120 includes an inlet or hydraulic coupler 136 fluidly coupled to the flow meter 130. A control module 146 and a first pressure sensor 142 are electrically coupled to the flow meter 130. In some embodiments, the flow meter 130 is an ultrasonic flow meter, and thus the control module 146 is an ultrasonic control module. An electronic control module 148 and a second pressure sensor 144 are also electrically coupled to the flow meter 130. Fluid directed through the flow meter 130 exits the flow meter 130 at the outlet 138, travels through the flowline 134, and enters the valve actuator assembly 132 at the inlet 150. In some embodiments, the valve actuator assembly 132 is a motor actuated control valve with position feedback. The valve actuator assembly 132 is fluidly coupled to an outlet or hydraulic coupler 152 of the flow valve assembly 120. The ultrasonic control module 146, the electronic control module 148, and the pressure sensors 142, 144 are used to operate the flow valve assembly 120, and are electrically coupled to an electrical connector 140 for signal and power communication to and from the flow valve assembly 120.

Figure 5A:
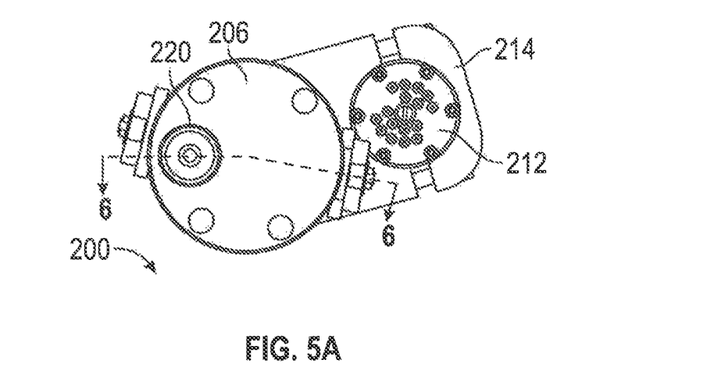
FIG. 5 is a side and end views of an embodiment of a flow meter system in accordance with principles disclosed herein.
Figure 5B:
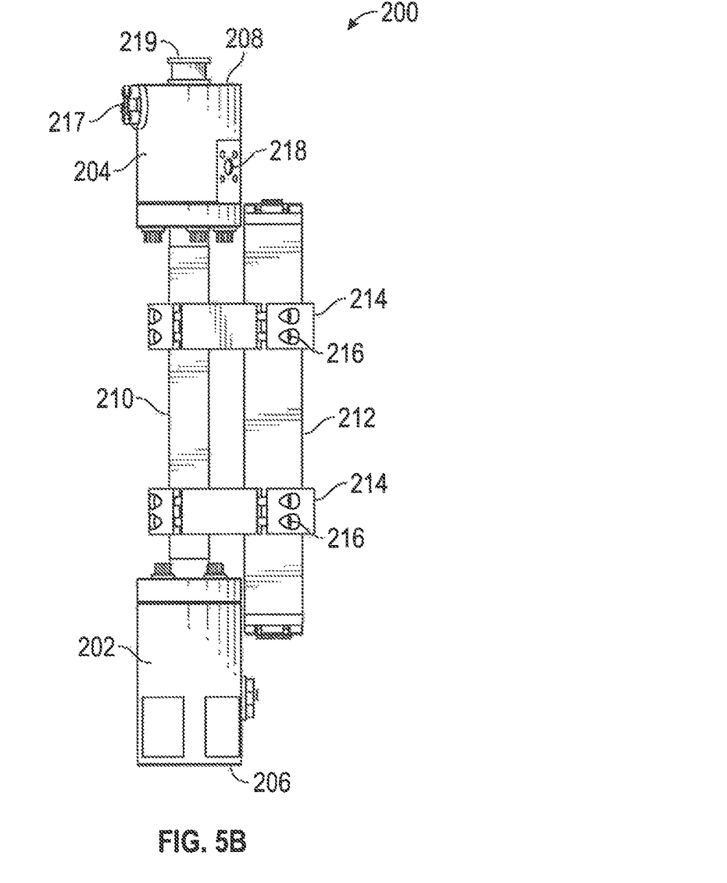
Figure 5C:
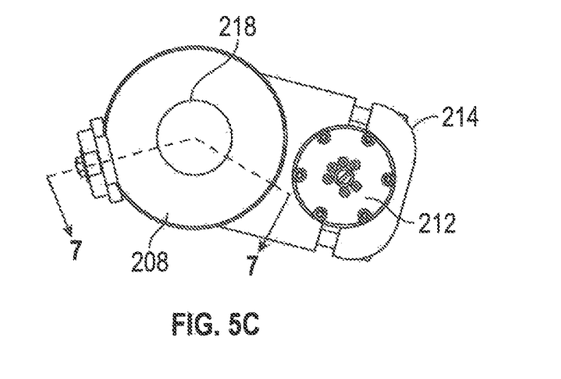

Referring next to FIG. 5, a side and end views of an embodiment of a flow meter system 200 is shown in accordance with principles of the present disclosure. In some embodiments, the flow meter system 200 is an ultrasonic flow meter system. In some embodiments, the flow meter system 200 can be used to replace the flow meter 130 of the above-described flow valve assembly 120. The flow meter system 200 includes a first sensor or transducer end 202 and a second sensor or transducer end 204. Coupled between the sensor ends 202, 204 is a fluid pipe or conduit 210. The first sensor end 202, which may also be referred to as an inlet or upstream sensor body, includes an inlet interface 206 having a fluid inlet 220. The second sensor end 204, which may also be referred to as an outlet or downstream sensor body, includes an outlet interface 208 having a fluid outlet 218 and other interface mechanisms 217, 219. A control module canister 212 is mounted on the flow meter system 200 using clamps 214 and retainers 216. In some embodiments, the canister 212 includes an ultrasonic control module. In some embodiments, the canister 212 is retained on the pipe 210.

Figure 6:
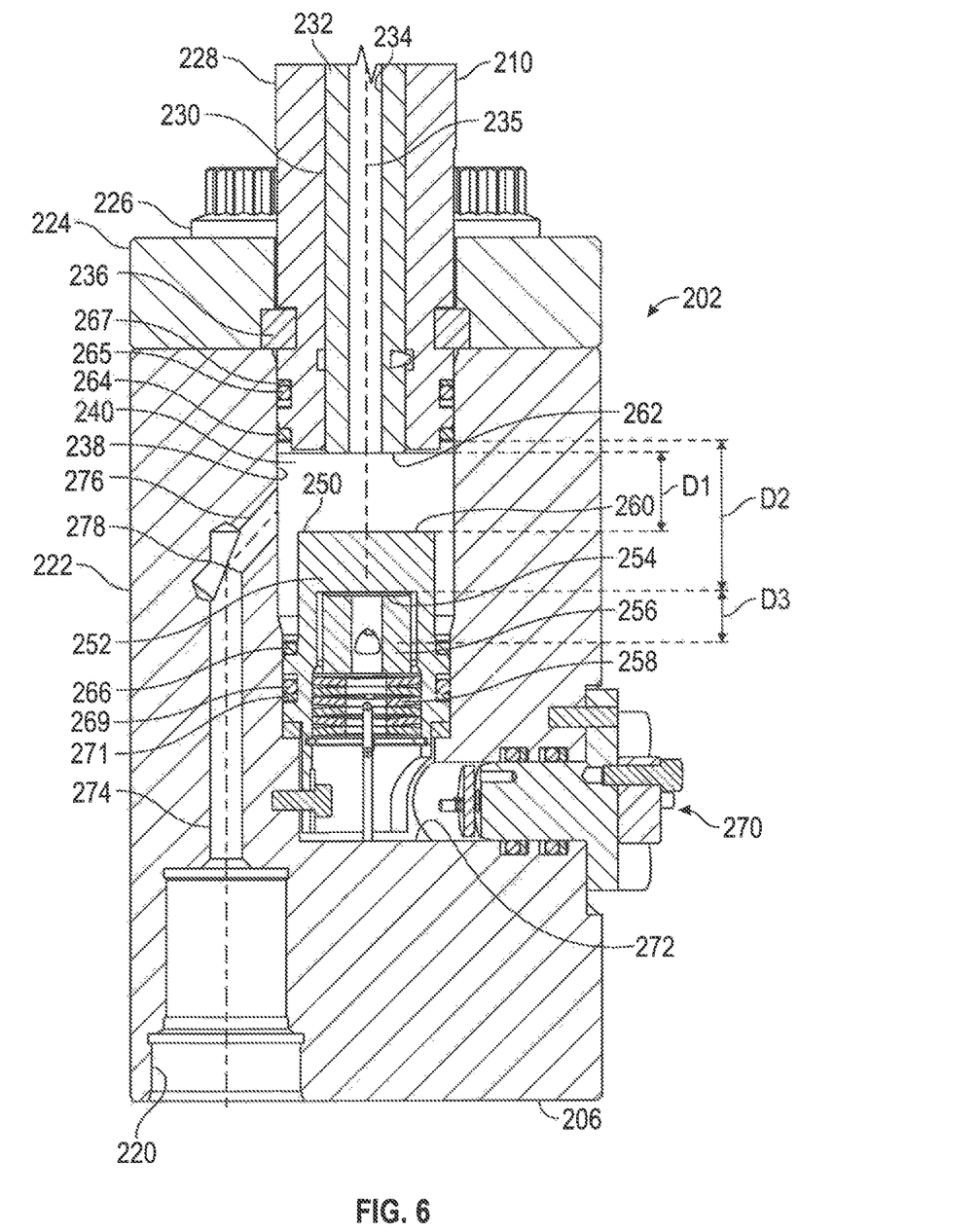
FIG. 6 is an enlarged, cross-section view of an inlet sensor body of the flow meter system of FIG. 5.

Referring now to FIG. 6, an enlarged, cross-section view of the inlet sensor body 202 is shown. The inlet sensor body 202 includes a housing 222, a retainer plate 224, a retainer or screw 226, and a retainer ring 236, which help to couple the pipe 210 to the housing 222. The pipe 210 may be sealed against the housing 222 by a first seal ring 264, a seal ring 265, and a backup ring 267. The pipe 210 includes an outer pipe or tube 228 and an inner pipe or tube 230. Disposed between the outer pipe 228 and the inner pipe 230 is an annular gap or flow passage 232. The inner pipe 230 includes an inner bore or flow passage 234 having an axis 235. In some embodiments, the outer pipe 228 comprises metal. In some embodiments, the metal is steel. In certain embodiments, the metal is stainless steel. In some embodiments, the inner pipe 230 comprises a non-metal material. In some embodiments, the non-metal material is an attenuative material. In some embodiments, the non-metal material is a polymer. In certain embodiments, the non-metal material is a thermoplastic polymer. In certain embodiments, the inner pipe 230 is made from polyether ether ketone (PEEK), or glass filled PEEK.

The housing 222 includes an internal bore 238, and a sensor or transducer assembly 250 is mounted in the bore 238. The sensor assembly 250 includes a sensor housing 252, a piezoelectric crystal 254, an inner support member 256, and a biasing or retention member 258 which can be, for example, a Bellville spring. The sensor housing 252 may be sealed against the housing 222 by a second seal ring 266, a seal ring 269, and a backup ring 271. In some embodiments, a threaded connection couples the sensor housing 252 to the housing 222. The sensor housing 252, the pipe 210, and the housing bore 238 form a fluid chamber or cavity 240 in the sensor body housing 222. A first dimension of the fluid chamber 240 is an axial distance $D_1$ between an end face 260 of the sensor housing 252 and an end face 262 of the pipe 210. A second dimension of the fluid chamber 240 is an axial distance $D_2$ between the first seal ring 264 and the piezoelectric crystal 254. In some embodiments, the first seal ring 264 is disposed adjacent the pipe end face 262. A third dimension of the fluid chamber 240 is an axial distance $D_3$ between the second seal ring 266 and the piezoelectric crystal 254. In some embodiments, the second seal ring 266 is disposed adjacent an intermediate portion of the sensor housing 252 and axially offset from the housing end face 262 and the piezoelectric crystal 254. In some embodiments, the second seal ring 266 is axially offset upstream of or backed away from the piezoelectric crystal 254. In some embodiments, the seal rings 264, 266 are made from metal. The fluid chamber 240 and the sensor assembly 250 are sealed inside the sensor body housing 222 by a wired connector 270 sealed against a radial bore 272. The wired connector 270 provides power and communications to and from the sensor assembly 250. In some embodiments, the wired connector 270 also seals the sensor assembly 250 from the external environment.

The fluid inlet 220 and the fluid chamber 240 are in fluid communication via the flow bore or passage 274 and the flow bore or passage 276 that come together at an angled junction 278. In some embodiments, the fluid inlet 220 includes an enlarged diameter as compared to the reduced diameters of the flow passages 274, 276.

Figure 7:
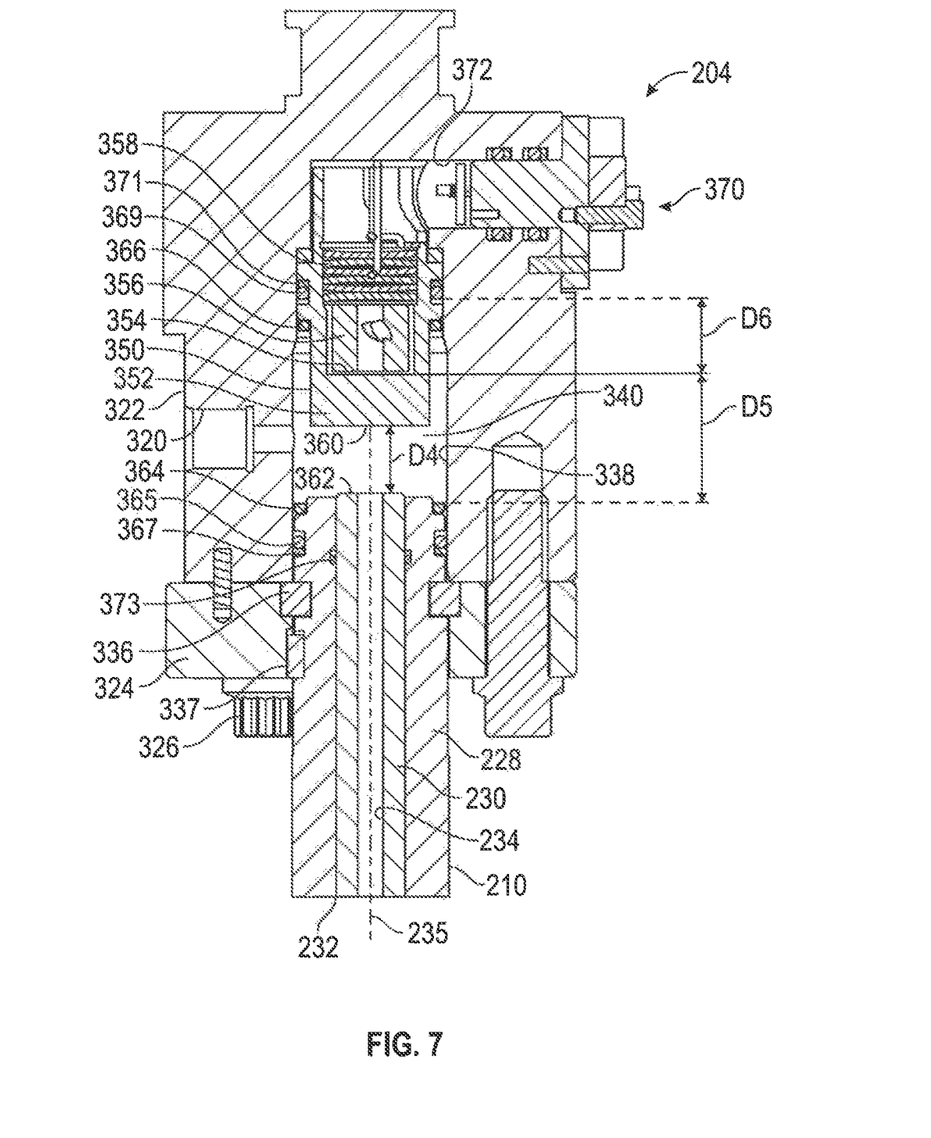
FIG. 7 is an enlarged, cross-section view of an outlet sensor body of the flow meter system of FIG. 5.

Referring next to FIG. 7, the second or outlet sensor end 204 is shown enlarged and in cross-section. The outlet sensor end 204 shares many of the same components as the inlet sensor end 202, with some differences. In the interest of clarity, similar components will not be described in detail while others will be focused on. For example, the outlet sensor end 204, like the inlet sensor end 202, includes a housing 322, a retainer plate 324, a retainer or screw 326, and a retainer ring 336, which help to couple the pipe 210 to the housing 322. The pipe 210 connection may further comprise an additional connection member 337. The pipe 210 may be sealed against the housing 322 by a first seal ring 364, a seal ring 365, and a backup ring 367. Furthermore, a seal ring 373 may be disposed in the fluid annulus 232 to provide a seal between the outer pipe 228 and the inner pipe 230.

The housing 322 includes an internal bore 338, and a sensor or transducer assembly 350 is mounted in the bore 338. The sensor assembly 350 includes a sensor housing 352, a piezoelectric crystal 354, an inner support member 356, and a biasing or retention member 358 which can be, for example, a Bellville spring. The sensor housing 352 may be sealed against the housing 322 by a second seal ring 366, a seal ring 369, and a backup ring 371. In some embodiments, a threaded connection couples the sensor housing 352 to the housing 322. The sensor housing 352, the pipe 210, and the housing bore 338 form a fluid chamber or cavity 340 in the sensor body housing 322. A first dimension of the fluid chamber 340 is an axial distance $D_4$ between an end face 360 of the sensor housing 352 and an end face 362 of the pipe 210. A second dimension of the fluid chamber 340 is an axial distance $D_5$ between the first seal ring 364 and the piezoelectric crystal 354. In some embodiments, the first seal ring 364 is disposed adjacent the pipe end face 362. A third dimension of the fluid chamber 340 is an axial distance $D_6$ between the second seal ring 366 and the piezoelectric crystal 354. In some embodiments, the second seal ring 366 is disposed adjacent an intermediate portion of the sensor housing 352 and axially offset from the housing end face 362 and the piezoelectric crystal 354. In some embodiments, the second seal ring 366 is axially offset downstream of or backed away from the piezoelectric crystal 354. In some embodiments, the seal rings 364, 366 are made from metal. The fluid chamber 340 and the sensor assembly 350 are sealed inside the sensor body housing 322 by a wired connector 370 sealed against a radial bore 372. The wired connector 370 provides power and communications to and from the sensor assembly 350. In some embodiments, the wired connector 370 also seals the sensor assembly 350 from the external environment The fluid chamber 340 is in fluid communication with a fluid outlet 320 of the sensor body housing 322.

In operation, a fluid, such as a chemical injection or other process fluid, is directed to the fluid inlet 220 of the inlet sensor end 202. The fluid then flows through the passage 274, through the angled junction 278, through the passage 276, and into the fluid chamber 240. In some embodiments, the angled junction 278 is designed to reduce cavitation in the fluid flowing therethrough and that is entering the fluid chamber 240. In some embodiments, one or more of the fluid passages 274, 276 are adjustable in diameter. For example, the diameters are adjustable between 5 mm, 6 mm, 7 mm, 8 mm, and other desirable diameters. In some embodiments, the fluid chamber 240 provides a volume in which the flowing fluid is allowed to slow down. In some embodiments, the reduction in velocity of the flowing fluid reduces cavitation in the fluid. In some embodiments, the velocity reduction causes the fluid to reach a steady state just prior to entering the tube flow bore 234. Consequently, in some embodiments, the fluid chamber 240 is an anti-cavitation, pro-steady state fluid chamber providing a more stable fluid flow to the internal bore 234 of the pipe 210. The angled flow passage just prior to the fluid chamber 240 can aid in the anti-cavitation effects in the fluid. The volume of the fluid chamber is determined by the diameter of the internal bore 238 and the axial distance $D_1$. In some embodiments, the axial distance $D_1$ is 0.5 in., but can also be other distances.

Fluid then flows from the fluid chamber 240 and into the pipe flow bore 234 as well as the fluid annulus 232 between the outer pipe 228 and the inner pipe 230. In some embodiments, the process fluid directed into the annulus 232 is allowed to stagnate therein because of the sealing of the seal ring 373 at the outlet sensor end 204. In some embodiments, the seal 373 prevents an unmetered flow of fluid through the annulus 232. Thus, the process fluid in the annulus 232 is at the same or substantially the same pressure as the process fluid flowing in the bore 234. Consequently, there is little or no pressure differential across the inner pipe 230, i.e., the inner pipe 230 is pressure-balanced. Because the inner pipe 230 is preferably made from an attenuative material, it absorbs ultrasound waves such that non-fluid paths of sound are absorbed while the inner pipe 230 is not subjected to high stress. Instead, because the annulus 232 fluid is at the process fluid pressure, the outer metal pipe 228 withstands the high stresses generated by the process fluid pressure differential. Thus, in one aspect, the outer pipe 228 is a pressure backup pipe to the inner attenuative pipe 230. In some embodiments, the process fluid pressures are 30,000 psi or above. In some embodiments, the internal flow bore 234 is adjustable in diameter. For example, the diameter is adjustable between 5 mm, 6 mm, 7 mm, 8 mm, and other desirable diameters.

As shown by the distances axial $D_2$, $D_3$, $D_5$, and $D_6$, the metal seals are axially offset from the piezoelectric crystals. Distancing the metal seals form the piezoelectric crystals helps to increase acoustic isolation of the piezoelectric crystals.

The flow meter system embodiments described above can be used to measure laminar fluid flow in high pressure systems with ultrasound. In some embodiments, the process fluid being measured ranges in viscosity from 0.1 cP to 500 cP, and such viscosities can be measured by the flow meter systems described herein. At laminar, and super laminar, flow rates the fluid velocity is low. Consequently, the time difference between pulses of ultrasound travelling upstream and downstream can be small (for example, nanoseconds) which makes repeatable measurement of the time difference (and thus velocity) challenging due to the noise that transmits between the two ultrasonic transducers via non-fluid paths. Such noise can affect processing of the ultrasonic signals. Further, high fluid pressure (such as 30,000 psi) will affect the materials of the pipes and transducers, which must be able to withstand high stresses generated by such high pressures. As described above, the inner pipe is made of an attenuative material that will absorb the non-fluid path noise, such as the sounds transmitted by solid components. The attenuative, non-metal inner pipe is surrounded by process fluid such that it is pressure-balanced, and the high pressure of the process fluid is transferred to the more robust outer metal pipe. The pressure-balancing annulus is disposed between the inner and outer pipes, thus it extends along the pipe 210. In some embodiments, the pressure-balancing is along the pipe 210 only, meaning the pressure-balancing is limited to the metering run only.

In the embodiments described above, the distances $D_1$ and $D_2$ can be pre-determined or chosen for optimum focal lengths between the transducer face and the pipe face. In some embodiments, the pre-determined optimum focal length is 0.5 in., though other focal lengths are chosen for desired results in other embodiments. In some embodiments, one or more of the transducers may include a pre-determined window thickness, for example, of 0.375 in. In some embodiments, a window thickness is the portion of the sensor housing 252 having an axial length of $D_2$ minus $D_1$ in FIG. 6. In some embodiments, a window thickness is the portion of the sensor housing 352 having an axial length of $D_5$ minus $D_4$ in FIG. 7.

Figure 8:
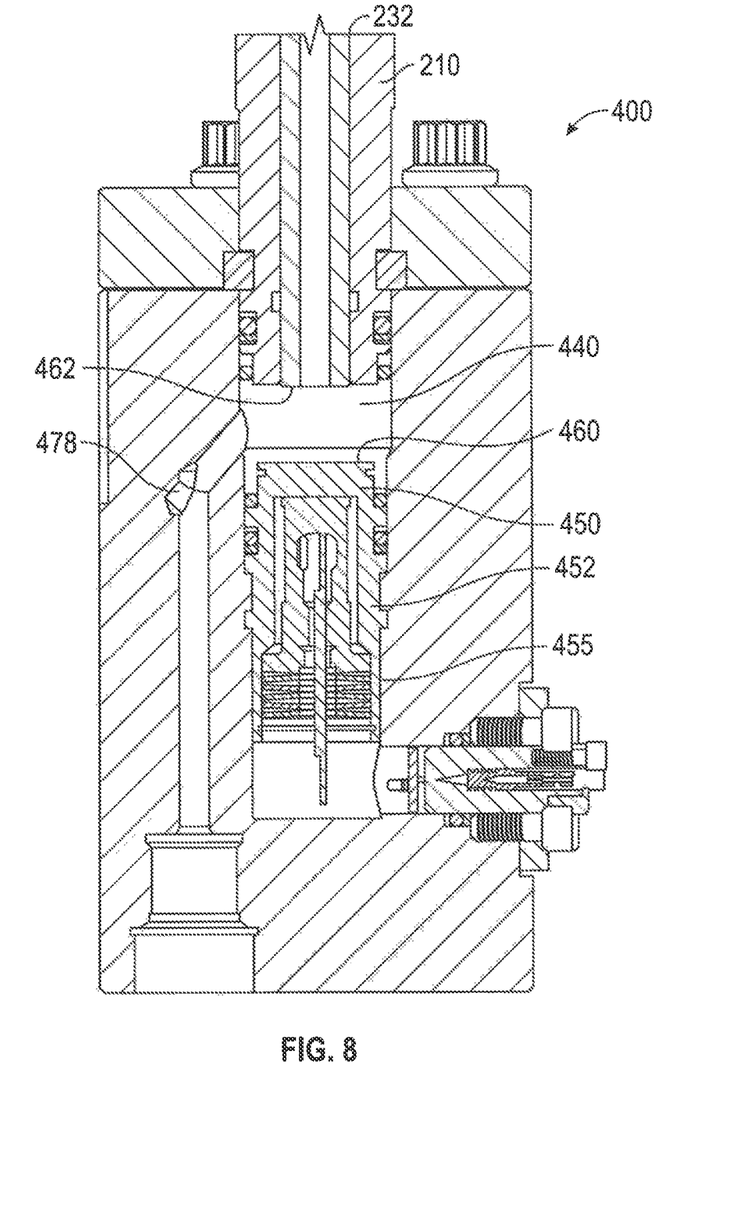
FIG. 8 is a cross-section view of an alternative embodiment of an inlet sensor body.

Referring to FIG. 8, an alternative embodiment of an inlet sensor body 400 is shown in cross-section. In certain embodiments, features of the sensor assembly are adjusted as compared to embodiments described above. For example, the size and shape of a sensor housing 452 of a sensor assembly 450 can vary at such locations as an end face 460 and a threaded connection 455. Other features are similar or vary only slightly from other embodiments described herein. For example, a fluid chamber 440 separates the sensor assembly 450 from an end face 462 of the pipe 210. The pipe 210 includes the fluid annulus 232 which can receive and stagnate process fluid for pressure balancing. An angled fluid inlet 478 carries fluid to the fluid chamber 440.

Figure 9:
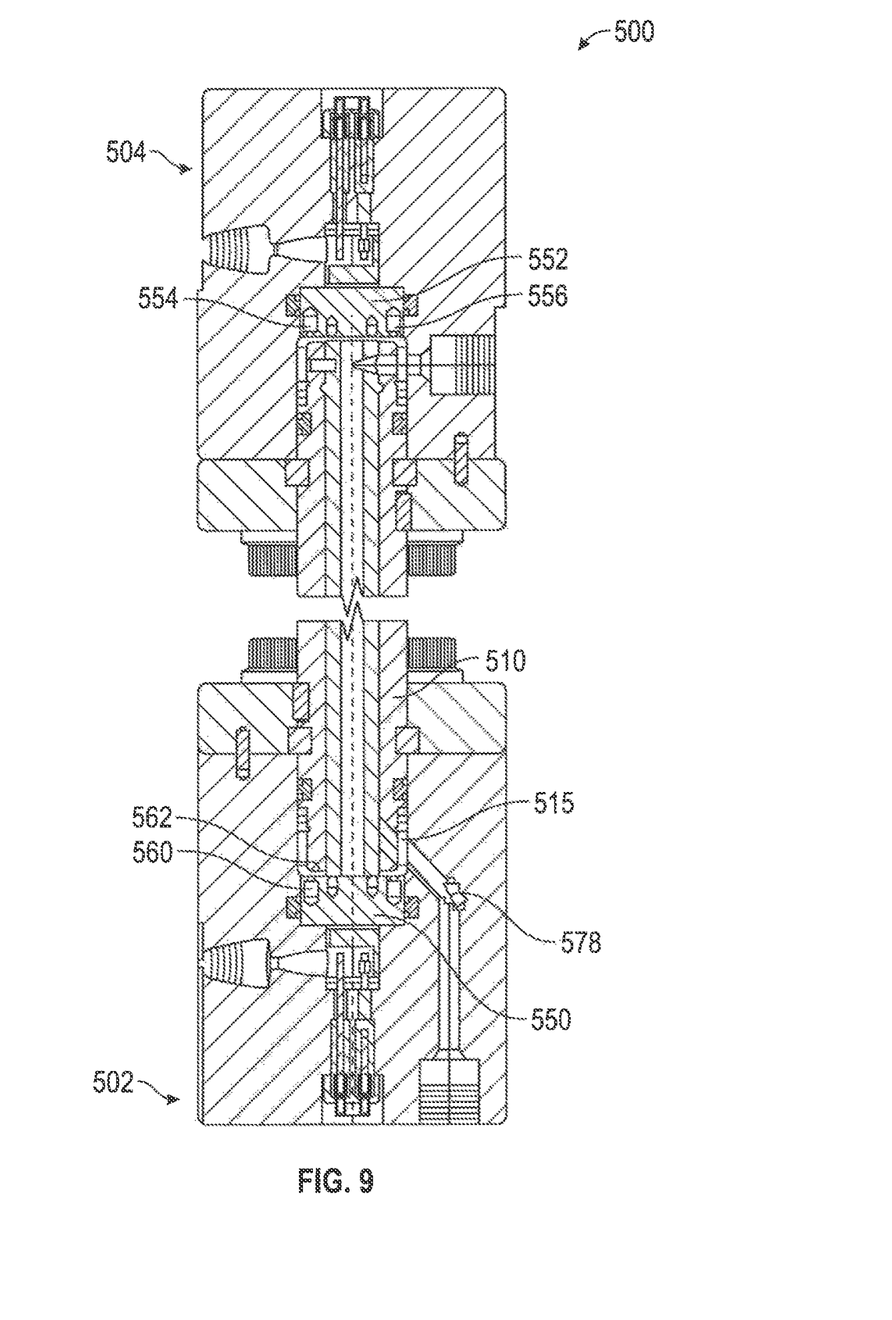
FIG. 9 is a cross-section view of another alternative embodiment of an inlet sensor body and an outlet sensor body of a flow meter system.

Referring to FIG. 9, a cross-section view of another alternative embodiment of an inlet sensor body 502 and an outlet sensor body 504 of a flow meter system 500 is shown. Certain features are adjusted as compared to embodiments described above. For example, the physical configurations of the sensor assemblies and adjacent structure are adjusted. A sensor assembly 550 next to an angled fluid inlet 578 includes an end face 560 that is in close proximity to an end face 562 of a flow conduit or metering pipe 510. In the outlet sensor body 504, a sensor assembly 552 includes an end face 554 that is in close proximity to an end face 556 of the metering pipe 510. Further, the piezoelectric crystals of the sensor assemblies 550, 552 are in-line and are not loaded or are uncompressed. Additionally, the angled fluid inlet 578 is directly coupled into the metering pipe 510 at a fluid connection 515.

Figure 10:
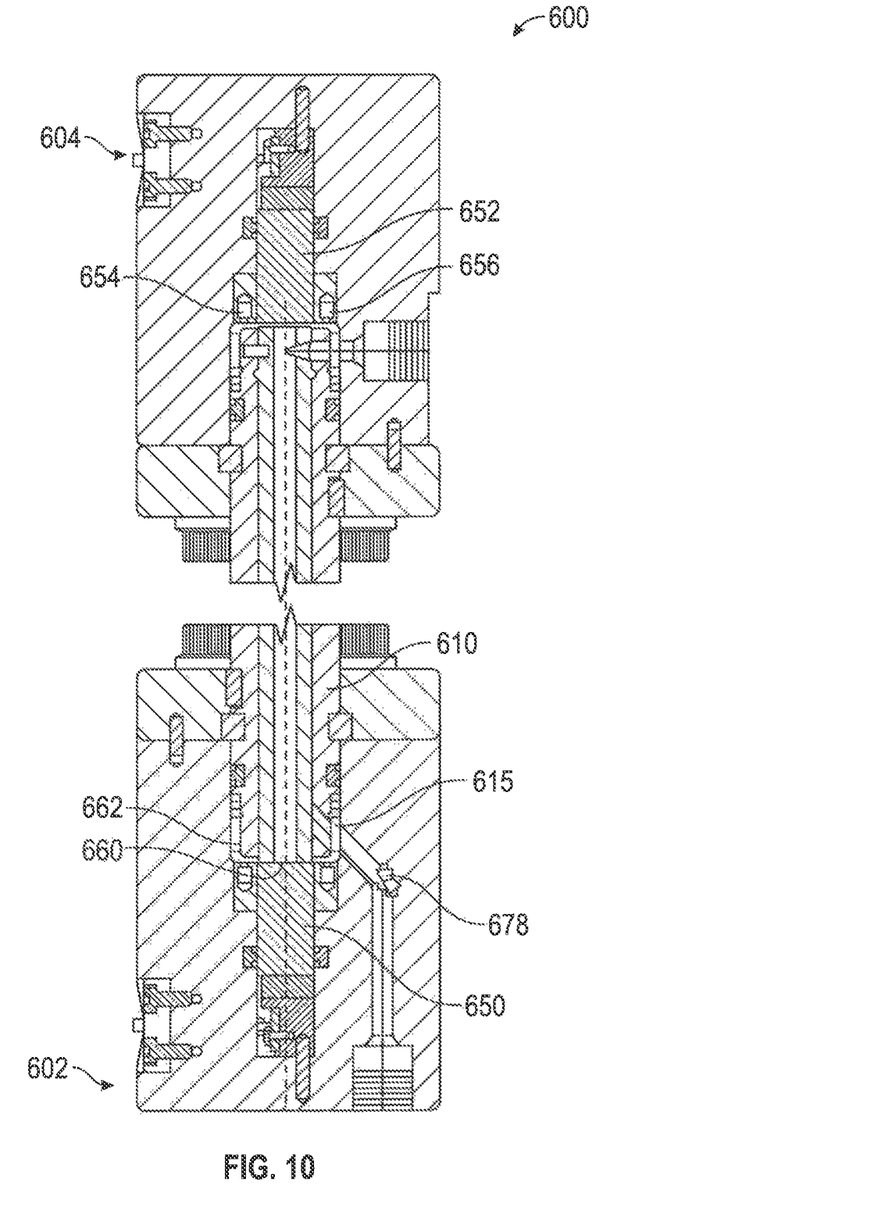
FIG. 10 is a cross-section view of a further alternative embodiment of an inlet sensor body and an outlet sensor body of a flow meter system.

Referring next to FIG. 10, a cross-section view of a further alternative embodiment of an inlet sensor body 602 and an outlet sensor body 604 of a flow meter system 600 is shown. Certain features are adjusted as compared to embodiments described above. For example, the physical configurations of the sensor assemblies and adjacent structure are adjusted. A sensor assembly 650 next to an angled fluid inlet 678 includes an end face 660 that is in close proximity to an end face 662 of a flow conduit or metering pipe 610. In the outlet sensor body 604, a sensor assembly 652 includes an end face 654 that is in close proximity to an end face 656 of the metering pipe 610. Further, the piezoelectric crystals of the sensor assemblies 650, 652 are not in-line but at right angles, and are loaded or are compressed. Additionally, the angled fluid inlet 678 is directly coupled into the metering pipe 610 at a fluid connection 615.

Figure 11:
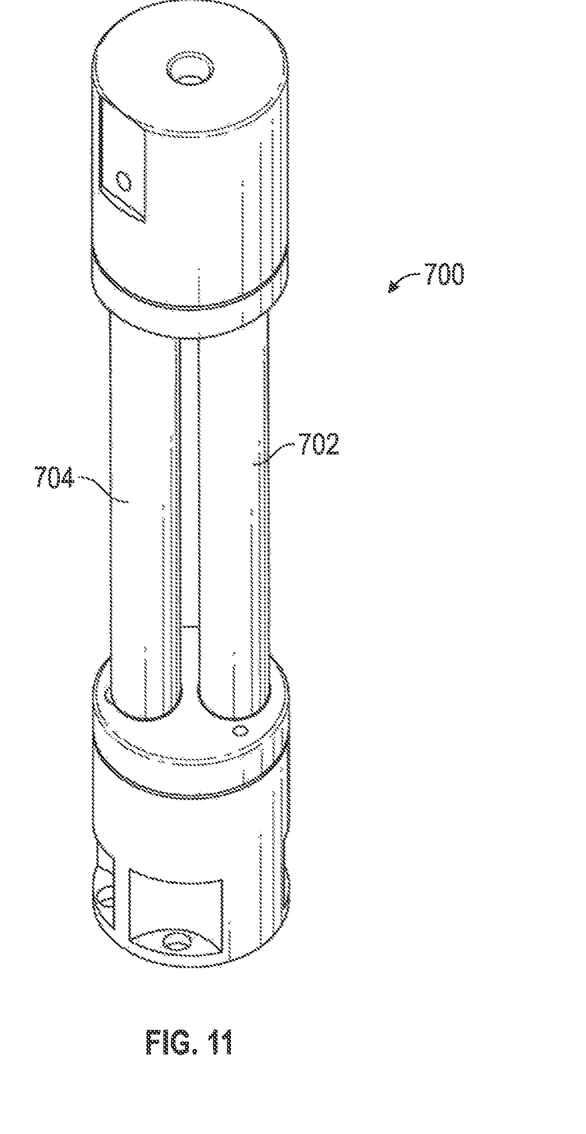
FIG. 11 is a perspective view of an alternative embodiment of a flow meter and valve assembly including a plurality of flow meter assemblies or cores.

Referring to FIG. 11, a perspective view of an alternative flow meter system 700 is shown, having a plurality of flow meter assemblies or cores 702, 704 in a single assembly.

According to various embodiments disclosed herein, a flow meter system is presented which can accurately measure low or very low flow rate or velocity of the process fluid using ultrasonic transducers. Further, various embodiments of the flow meter system can accurately measure viscous fluids with ultrasonic transducers. The flow meter system embodiments are configurable to variously measure fluid velocity, fluid flow rate, fluid viscosity, fluid pressure, and other fluid characteristics, or a combination thereof.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A flow meter comprising:
   a first flow sensor with a first outer housing
   a second flow sensor with a second outer housing;
   a first fluid flow conduit coupled to and extending between the first and second flow sensors; and
   a second fluid flow conduit disposed inside the first fluid flow conduit thereby forming a fluid annulus between the first and second fluid flow conduits;
   wherein the first fluid flow conduit is metal to resist a fluid pressure differential and the second fluid flow conduit is non-metal to balance a fluid pressure across the second fluid flow conduit and attenuate noise therein;
   wherein the fluid annulus is configured to receive a fluid to balance the fluid pressure across the second fluid flow conduit.

2. The flow meter of claim 1 wherein the second fluid flow conduit includes an internal bore to receive a process fluid that is also the received fluid of the fluid annulus.

3. The flow meter of claim 1 further comprising:
   a first flow sensor housing surrounding the first flow sensor; and
   an axial distance between an end face of the first and second fluid flow conduits and the first flow sensor housing.

4. The flow meter of claim 3 wherein the axial distance forms a fluid chamber to reduce fluid cavitation.

5. The flow meter of claim 3 wherein the axial distance is a pre-determined focal length for the first flow sensor.

6. The flow meter of claim 5 wherein the first flow sensor includes a pre-determined window thickness.

7. The flow meter of claim 1 further comprising:
   a fluid inlet in the first outer housing having an angled junction to reduce fluid cavitation.

8. A flow meter system comprising a flow meter assembly having a plurality of cores, wherein each core comprises the flow meter of claim 1.

9. The flow meter of claim 1 wherein the noise attenuation of the second fluid flow conduit allows the first flow sensor to measure a laminar flow rate at high pressure.

10. The flow meter of claim 1 wherein the first flow sensor is configured to measure a fluid viscosity.

11. The flow meter of claim 1 wherein the first flow sensor is configured to measure a fluid pressure.

12. The flow meter of claim 1 wherein the second fluid flow conduit is interchangeable.

13. The flow meter of claim 12 wherein an internal bore of the second fluid flow conduit is configured to flow a fluid in a viscosity range of 0.1 cP to 500 cP.

14. The flow meter of claim 1 further comprising a seal disposed between the first and second fluid flow conduits to stagnate the received fluid in the fluid annulus.

15. The flow meter of claim 1 further comprising:
    a first metal seal between the first outer housing and the first flow sensor; and
    a second metal seal between the first outer housing and the first fluid flow conduit;
    wherein the first and second metal seals are axially offset relative to a crystal of the first flow sensor.

16. The flow meter of claim 1 further comprising:
    a first metal seal between the first outer housing and the first flow sensor;
    a second metal seal between the first outer housing and the first fluid flow conduit, wherein the first and second metal seals are axially offset relative to a crystal of the first flow sensor;
    a third metal seal between the second outer housing and the second flow sensor;
    a fourth metal seal between the second outer housing and the first fluid flow conduit, wherein the third and fourth metal seals are axially offset relative to a crystal of the second flow sensor.

17. The flow meter of claim 1 coupled to a chemical injection management system.

* * * * *